March 26, 1968    L. I. MONROE    3,374,545
CAMBER GAUGE

Filed May 3, 1965    2 Sheets-Sheet 1

Inventor:
Lloyd I. Monroe

March 26, 1968   L. I. MONROE   3,374,545
CAMBER GAUGE

Filed May 3, 1965   2 Sheets-Sheet 2

Inventor:
Lloyd I. Monroe 3,374,545
CAMBER GAUGE
Lloyd I. Monroe, 15 Belmont St.,
Danbury, Conn. 06810
Filed May 3, 1965, Ser. No. 452,529
2 Claims. (Cl. 33—74)

ABSTRACT OF THE DISCLOSURE

A camber gauge having a staff on which is slidably mounted a slide having a plurality of adjustable scales. This camber gauge is used for determining the true relationship of a finished deck slab and the supporting girders of bridges taking into account allowance which must be made for deflections, offsets and vertical curves.

Summary of the invention

The device for which the Letters Patent are being sought is primarily for the use of engineers and contractors for determining the true relationship of the finished deck slab and the supporting girders of bridges with due allowances for deflections, offsets and vertical curves. These relationships are presently determined by a laborious process of field surveying and office calculations. This new invention is designed to obtain the required information in a direct manner and to a much greater degree of accuracy. It also greatly reduces the possibilities of errors by eliminating many calculations as well as conversion of decimals of feet to inches and fractions of inches.

The camber gauge consists of a graduated staff supporting an adjustable slide which in turn supports independently adjustable scales.

Description of the views

Figure 1:
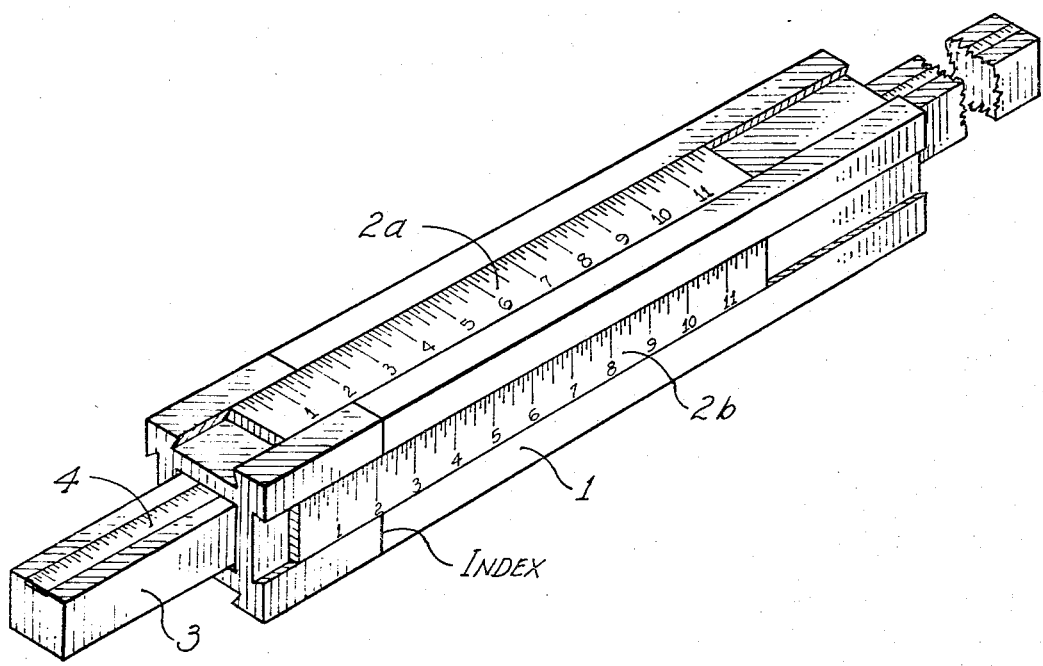
Figure 2:
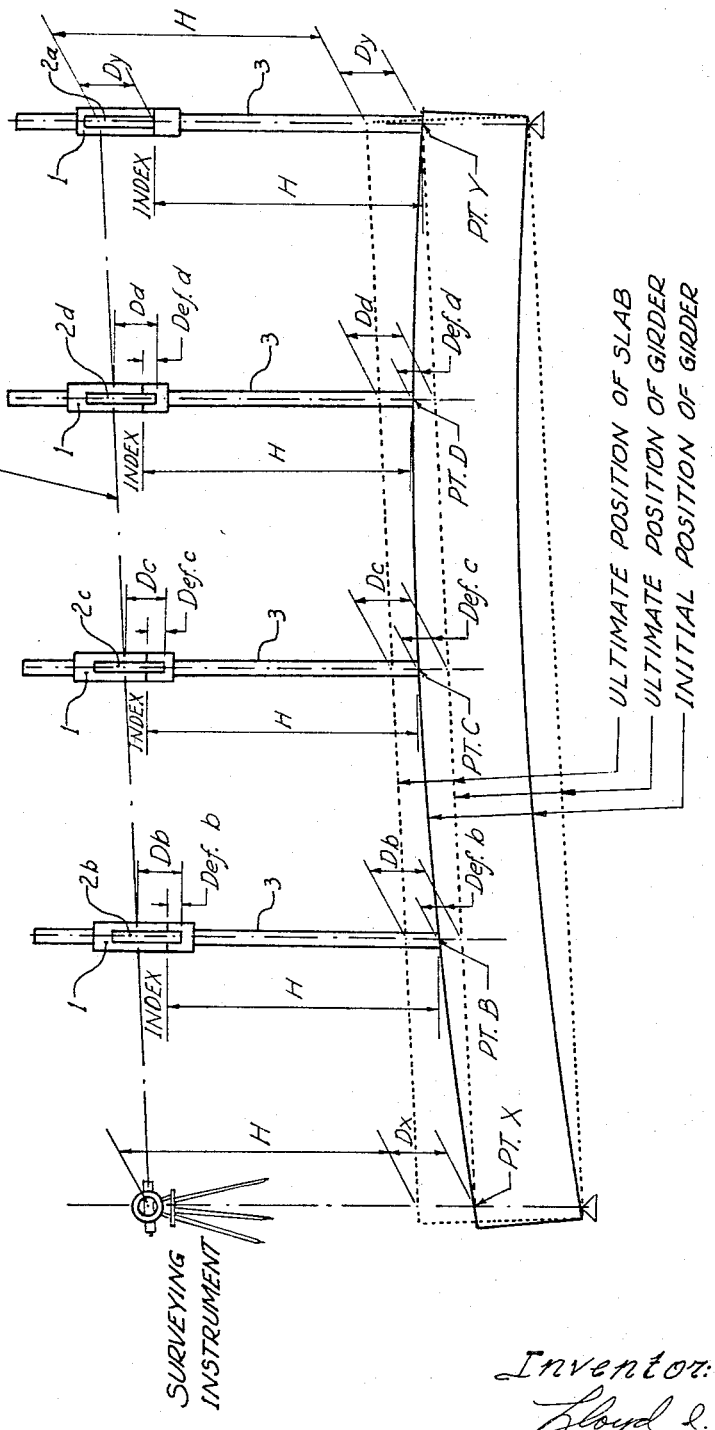

FIGURE 1 is a perspective view of the invention showing the assembly of the various component parts.
FIGURE 2 is a schematic view intended to demonstrate the principal manner of using the camber gauge.

Detailed description

FIGURE 1. The camber gauge consists of three principal parts; the adjustable slide 1, the adjustable scales 2a, 2b, etc. and the graduated staff 3.

The slide 1 is so made as to fit over the staff 3 and be adjustable vertically along the staff to any desired height. It is held in the vertical positions by a conventional friction clamp or set screw. Each face of the slide is slotted or grooved to accommodate a graduated scale 2a, 2b, etc. Each face of the slide is also marked with a horizontal line (index) which is the intersection of a horizontal plane when the slide is in its vertical position.

The scales (2a, 2b, etc.) fit in, and are adjustable vertically within their respective slots provided in the slide 1. They are held in their desired relationship with the index by conventional thumb screws or friction springs. They are graduated in inches and fractions with the zero end at the bottom.

The staff 3 is of suitable size and shape to fit through the vertical opening of, and to support the slide 1. One face of the staff contains a scale graduated in feet, inches and fractions of inches increasing from the bottom toward the top. This scale is oriented so that the reading at the bottom of the slide represents the height of the index from the bottom of the staff.

Description of use and operation

During the construction of bridge decks it is necessary to allow for the downward deflection of the supporting girders when they are subjected to the loads of the concrete deck slabs. This deflection is at times in magnitudes of several inches and varies from span to span and even from one girder to an adjacent girder depending on a great many factors. This deflection can be quite accurately pre-determined but there are no practicable means by which the girders can be manufactured with a built-in camber within an acceptable degree of accuracy. Consequently, it becomes necessary after the girders are in position to determine the depths of the concrete to be placed at several points along the length of the girder. This has previously been accomplished by a series of operations wherein the in-place elevations of the girder top at many points along its length are determined by level readings referenced to a bench mark. These are then related to the theoretical elevations of the finished slab by performing a series of arithametic steps, allowing for the ultimate deflection of the girder as well as the ordinates of horizontal curves and vertical curves should one or both of the latter exist. These relations are then translated into vertical distances from the girder to the finished surface of the deck and converted from decimals of feet to inches and fractions of inches. From this the screeds and rails are then set to control the location of the plane or planes of the finished surface.

The manner of accomplishing this directly by the use of the camber gauge is demonstrated in FIGURE 2. A surveying instrument is set over point X at one end of the girder and its height (H) above the finished deck surface at that point is measured. This height is the actual distance above the girder less the depth $Dx$ of the slab to be constructed. The slide 1 is set so that the bottom of the slide is exactly at distance H on the staff scale 4. The index is thus located at exactly the same height (H) above the bottom of the staff 3; scale 4 having been oriented on the staff to allow for the distance from the bottom of slide 1 to the index line. The gauge is next held on point Y at the opposite end of the girder with scale 2a set at index reading zero. Scale 2a is sighted with the surveying instrument and the telescope is clamped with the cross hair reading on scale 2a the value $Dy$ which is the depth of the slab at point Y. The line of sight is now exactly parallel with a straight grade or line between points X and Y.

Scale 2b is set to the index reading equal to the pre-determined deflection b and the gauge is held on point B. The reading on scale 2b is now the depth $Db$ to which the slab must be constructed if it is to conform to a straight line between X and Y after its weight has caused the girder to assume its ultimate position. This depth $Db$ now becomes a control for setting the screeds and rails from which the finished surface is to be constructed and also is the depth to be used in calculating the amount of concrete placed in the deck at that point.

Scale 2c is set to the index reading equal to the pre-determined deflection c and the depth $Dc$ is read at point C. Depth $Dd$ is similarly determined and the process repeated as many times as desired. The proper depths of slab are thus determined regardless of the configuration of the girder assuring adherence to a true, even surface.

Where it is desired to obtain this information at a greater number of points along the girder the scales may be reset for the appropriate points or the slide may be made with six or eight faces to provide a larger number of scales.

By dividing the girder into equal parts the setting for each scale applies at two locations symmetrical about the center of the girder. Each face of the slide is appropriately labelled to assure that the proper scale is read at each point.

In the case of multiple spans the surveying instrument need only be set up at alternate piers and the readings taken on the girders in either direction since one of the principles of the camber gauge is the use of a line of sight parallel with the controlling points regardless of whether one end is level with, or higher or lower than the other. This same principle makes the camber gauge also adaptable to so-called continuous span bridges.

In the cases of horizontal and vertical curves, corrections as required may be predetermined and added to or subtracted from the corrections for the deflections, and the scales set accordingly to assure that the finished configuration of the deck slab will conform to all requirements.

Should it be desired to determine the existing camber or sag of a girder or the as-built camber or sag of a structure a procedure similar to that described above can be employed. In the instances of convex curves or cambers the slide 1 is inverted with one scale at index reading zero. The index is set at a height equal to the height of the instrument which occupies one of the control points and the line of sight is established by targeting in on the index when the gauge is held at the other control point. At any point between the two control points the reading on the scale will be the amount of camber at that location. When an inverted camber or sag is involved the same procedure is followed using a single scale reading index zero but with the gauge in its normal upright position.

When it is desired to determine the camber along the bottom of a girder, the roof of a tunnel, roof of a culvert or similar overhead surface the same or similar procedures as described above can be followed with the instrument below the control points and the gauge erect or inverted as required.

Other applications of this device can be made for establishing controls or determining existing configurations of other surfaces both vertical and horizontal. To establish a horizontal arc of a circular curve the surveying instrument is set at one end of the chord of the arc and the line of sight fixed along the chord. The ordinates of the arc are established by using the camber gauge in a horizontal position with the various scales set at index readings appropriate to their particular locations along the arc. Conversely the ordinates of any curve may be determined in a similar manner by reading the values on any one scale set at index reading zero. This usage can be applied to circular, parabolic or irregular curves.

I claim:
1. A device consisting of a graduated staff, a slide which fits around the staff and is adjustable along the staff, said slide having a plurality of sides, a groove in each of said sides, a graduated scale slidably mounted in each of said grooves and an index line marked on each of said sides adjacent said graduated scales for use with a sight line in any inclined or level reference plane for directly determining the various depths of concrete slab to be constructed for bridge decks with full allowance for the initial configuration of the supporting girder before the concrete is placed; with full allowance for the deflection that will occur in that girder when the concrete is placed; and with full allowance for any desired vertical and/or horizontal curvature of the finished deck; all to assure that the surface of the finished deck conforms to the desired plane or planes.

2. A device consisting of a graduated staff, a slide which fits around the staff and is adjustable along the staff, said slide having a plurality of sides, a groove in each of said sides, a graduated scale slidably mounted in each of said grooves and an index line marked on each of said sides adjacent said graduated scales for use with a vertical or horizontal plane of sight for determining and/or setting the relative positions or ordinates of or on the various components of bridges, tunnels, walls or other structures, said points being above, below or to either side of the plane of sight and lying in straight lines, curved lines or any combination thereof.

References Cited

UNITED STATES PATENTS

| | | | |
|---|---|---|---|
| 830,640 | 9/1906 | Brown | 33—60 |
| 985,784 | 3/1911 | Dailey | 33—74 |
| 1,195,342 | 8/1916 | Ducklow | 33—74 |
| 2,207,375 | 7/1940 | Friedell | 235—70 X |
| 2,221,229 | 11/1940 | Cain et al. | 33—74 X |
| 2,660,822 | 12/1953 | Hargus | 33—74 X |

WILLIAM D. MARTIN, JR., *Primary Examiner.*